H. J. MAGRATH.
TREATMENT OF WATER FOR SOFTENING, STERILIZING, AND LIKE PURPOSES.
APPLICATION FILED AUG. 31, 1921.
1,423,132.
Patented July 18, 1922.
3 SHEETS—SHEET 1.
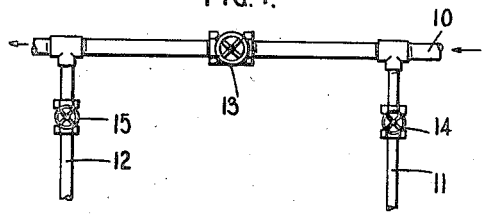
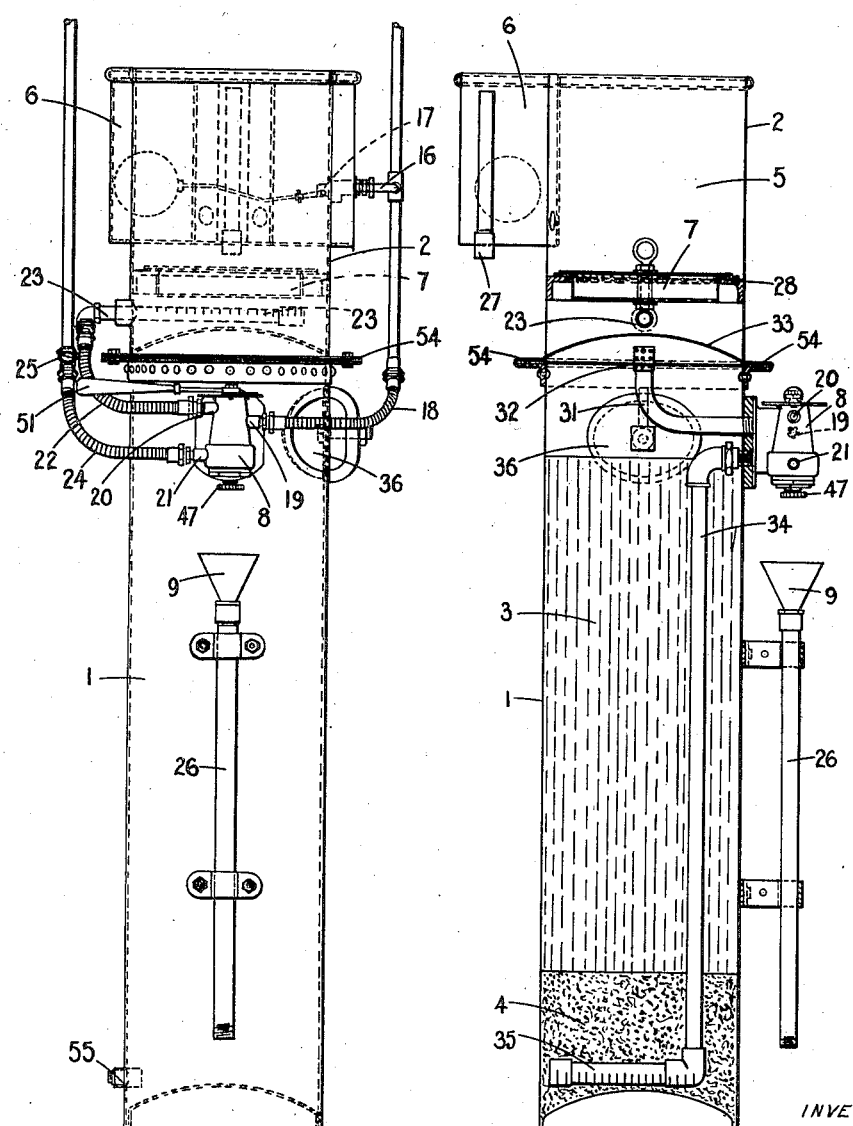
INVENTOR
Henry J. Magrath
by
Hubert A. Gill.
Attorney H. J. MAGRATH.
TREATMENT OF WATER FOR SOFTENING, STERILIZING, AND LIKE PURPOSES.
APPLICATION FILED AUG. 31, 1921.
1,423,132.
Patented July 18, 1922.
3 SHEETS—SHEET 2.
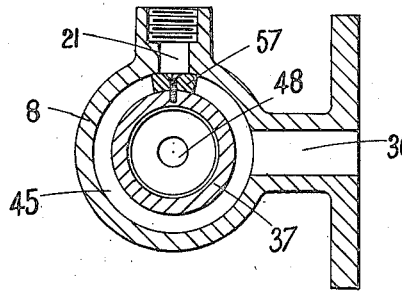
FIG. 7ª
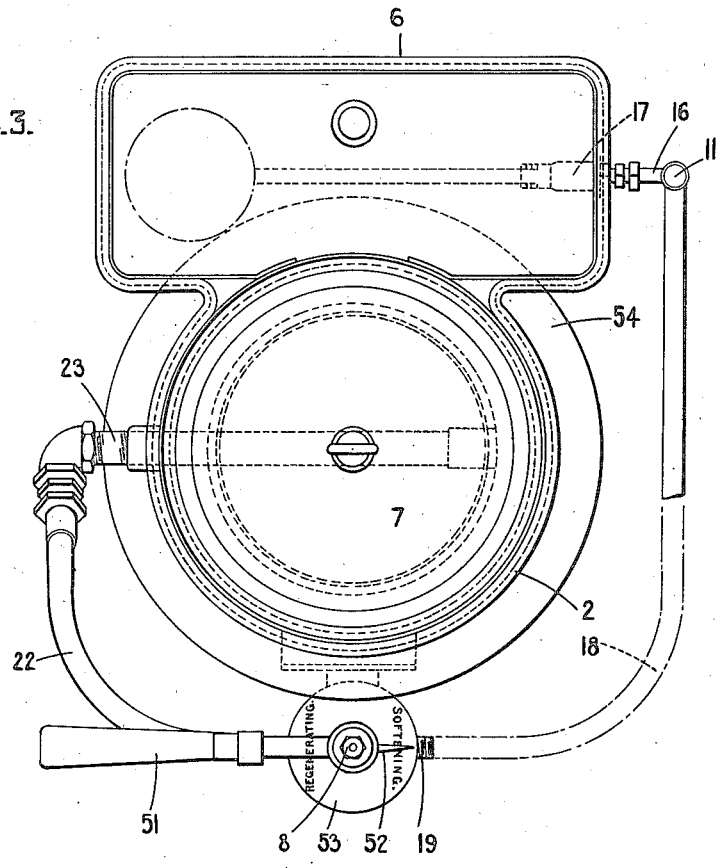
FIG. 3.
INVENTOR
Henry J. Magrath
by
Hubert A. Gill
Attorney H. J. MAGRATH.
TREATMENT OF WATER FOR SOFTENING, STERILIZING, AND LIKE PURPOSES.
APPLICATION FILED AUG. 31, 1921.
1,423,132.
Patented July 18, 1922.
3 SHEETS—SHEET 3.
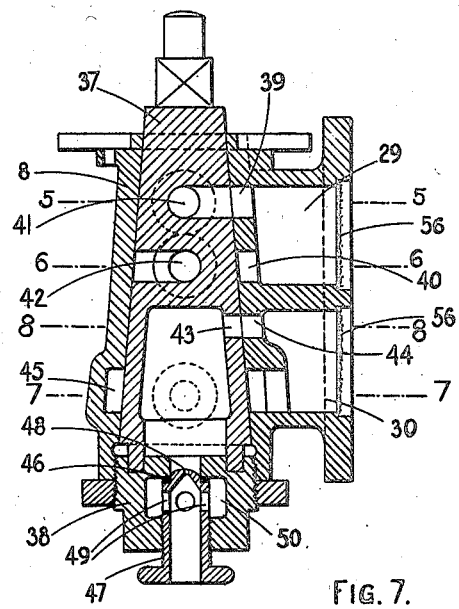
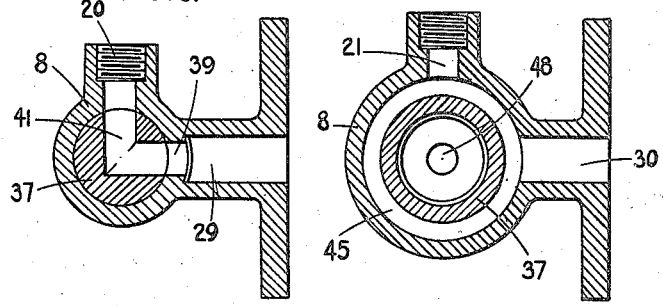
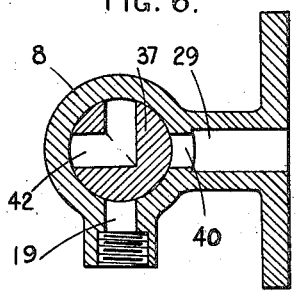
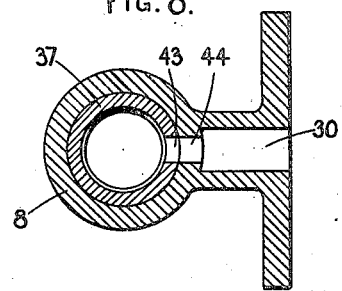
INVENTOR

UNITED STATES PATENT OFFICE.

HENRY J. MAGRATH, OF LONDON, ENGLAND.

TREATMENT OF WATER FOR SOFTENING, STERILIZING, AND LIKE PURPOSES.

1,423,132.       Specification of Letters Patent.     Patented July 18, 1922.

Application filed August 31, 1921. Serial No. 497,334.

*To all whom it may concern:*

Be it known that I, HENRY JAMES MAGRATH, a subject of the King of Great Britain, and resident of 10/11 Berkley Street, London, E. C. 1, England, have invented certain new and useful Improvements in the Treatment of Water for Softening, Sterilizing, and like Purposes (for which I have filed an application No. 158,498 in England, dated September 13th, 1920), of which the following is a specification.

This invention relates to the treatment of water for softening, sterilizing and like purposes, and it may be regarded as an improvement upon or modification of the invention set forth in the specification of my Patent No. 1211735. According to that invention a plant was provided, suitable for use in softening or otherwise treating water for use in private houses, hotels and so forth, and adapted to be operated without skilled attention. The plant according to the present invention is also suitable for use in this way, and it embodies certain improvements in the design of the receptacle for the active agent such as a natural or artificial zeolite for water softening, the tank for the regenerating solution, the provision of a removable filter for preventing particles from the regenerating tank from passing into the cock, and improvements in the connections of the various compartments of the plant through the cock to the inlet and outlet pipes, and the waste pipe for the regenerating and washing liquids. These and other features of the plant will be described in connection with the accompanying drawings which illustrate a plant constructed according to the invention.

In the drawings:—

Figure 1 shows the plant in front elevation.

Figure 2 shows it in transverse section.

Figure 3 shows a plan to a larger scale.

Figure 4 shows the triple cock in section.

Figures 5, 6, 7 and 8 are sections of the cock taken on the lines 5—5, 6—6, 7—7 and 8—8 respectively of Figure 4.

Figure 7ª shows a slight modification in the section of Figure 7.

Referring to Figures 1 and 2, a vessel is provided consisting of a lower cylinder 1 and an upper cylinder 2 which are made separable, the lower cylinder containing the active agent 3 such as a zeolite resting on a bed 4 of gravel or the like, while the upper part comprises the solution compartment 5 which is supplied with water from a ball-valve cistern 6, and a removable filter 7. The shell of the triple cock is numbered 8, and the funnel of the drain pipe 9. The house water supply main 10, Figure 1, is preferably provided with two branches 11 and 12, an emergency valve 13 being inserted in the main pipe between the branches, and emergency valves 14, 15, one in each branch. From the branch pipe 11 another pipe 16 leads to the ball tap 17 in cistern 6. A length of flexible tubing 18 leads from pipe 11 to the inlet socket 19 of the triple cock shell 8. On the side opposite to socket 19 are two sockets 20, 21, the upper of which is connected by flexible piping 22 to the end of a pipe 23 extending into the upper tank 2, while the lower socket 21 is connected by a length of flexible piping 24 to a water meter 25 and the branch pipe 12. The funnel 9 is on the top of a pipe 26 which is connected with a suitable fall to a drain. The overflow standpipe 27 of the ball-cistern 6 should also be connected to a drain.

The pipe 23 is closed at its end, and is perforated or formed with slits to receive the solution after it passes through the filter 7. This filter rests on a flange 28 in the upper tank 2, with a suitable jointing material such as a ring of india-rubber to make a fluid-tight joint on the flange. The triple cock shell 8 has two chambers 29, 30, at the rear communicating if desired through gauze screens 56, Figure 4, with pipes 31 and 34. The upper part of the triple cock communicates through the chamber 29 and pipe 31 with a distributing head 32 at the end of the pipe inside the domed cover 33 of cylinder 1, which cover is the bottom of cylinder 2. The lower part of the triple cock communicates through the chamber 30 with the pipe 34 which passes through the zeolite bed 3 and gravel bed 4, and terminates in a perforated or slitted collecting pipe 35. The cylinder 1 preferably has a hand hole near the top, closed by a cover 36.

The triple cock shell 8 has its plug 37 provided with two L-shaped passages 41, 42, in its upper part, while its lower part is hollow and terminates in a flange turning in a recess in the bottom cap 38 of the cock. Holes 39 and 40 communicating with chamber 29 and pipe 31, are adapted to register with the passages 41 and 42 in different positions of the plug 37 of the cock, while a hole 43 in the plug registers with a hole 44 leading from chamber 30 in one position of said plug, and a channel 45 around the plug always connects chamber 30 with the outlet socket 21. A seating at 46 in the cap 38 receives the shoulder of a hollow screw plug 47; the upper end of this plug is provided with a small hole at 48 through which the slow trickling outflow takes place during regenerating; or by screwing back the plug a little way a faster flow can be permitted past the seating 46 into an annular space 50 and out through holes at 49 in the sides of plug 47. The cock is turned by a handle 51, Figure 3, while a pointer 52 working over a dial 53 indicates when the cock is in position for water softening or for regenerating respectively. The cylinder 1 is provided at 55 with an emergency drain plug. This is only used for draining the cylinder in case of a stoppage in the pipe system, or any other interruption of normal working which necessitates the emptying of cylinder 1.

In setting up the plant, the main cylinder 1 is put in position with the upper part 2 removed, the part 1 is partly filled with water, for instance by opening valve 15, which allows water to enter through pipes 34 and 35, via 24, 21, 45 and 30; the gravel 4 is introduced, and then the zeolite or other reagent 3. The upper part 2 is then fitted, and connected in a fluid-tight manner by bolts around the flange 54. All the pipe connections are completed and the plant is now filled as follows: Valve 15 is closed, valve 14 is opened, and water can now fill the cistern 6, and can enter cylinder 1 through pipe 18, socket 19, passage 42, and pipe 31, while the cock is in the softening position. By moving the cock every few minutes into the regenerating position and then back again into the softening position, and so forth, air is expelled from the system through the pipe 31, passage 41, socket 20, pipe 22, and through the solution tank 5, until the whole system is full of water and is ready to operate. Valve 13 is now closed and valve 15 is opened.

The normal operation of the plant is as follows: When the cock is in the softening position, water enters through pipe 11 and socket 19, passes through L-shaped passage 42 in the cock into chamber 29, thence through pipe 31 and distributing head 32 into the chamber 1. After flowing through the beds 3 and 4 the softened water leaves by collecting pipe 35, pipe 34, chamber 30, channel 45, outlet socket 21, pipe 24, meter 25, pipe 12, and so to the household supply pipes. Valve 13 of course is closed while valves 14 and 15 are open, but in the event of any failure in the plant it can be cut out of circuit by closing valves 14 and 15, while valve 13 is opened to allow a supply of unsoftened water to flow.

When the softened water supply has been running for a time, usually several days, the meter 25 will indicate that an amount has been taken such that the reagent 3 requires regenerating. The necessary quantity of salt for regenerating is placed in the tank 2, and the cock is turned to the regenerating position wherein 42 is closed, but 41 is open, and also 43, 44. The first result of this is that water from the house supply pipes flows back through pipes 12, 24, socket 21, channel 45, chamber 30, pipe 34, 35, and upwardly through the bed 3, producing a useful agitating action in this latter which tends to prevent close packing of the granules, and the consequent channelling. Such channelling, when the flow takes place always in one direction, results in the inefficient use of the base-exchanging material, and the initial reverse flow on starting to regenerate is important in eliminating risk of this. The upwardly flowing water passes out through head 32, pipe 31, chamber 29, passage 41, (Figure 5), socket 20, pipes 22, 23, and through the filter 7 into the solution compartment 5, assisting in dissolving the salt introduced into said compartment, and flowing back ultimately as solution through the apparatus. The space in compartment 5 above the normal water level controlled by float valve 17 therein is sufficient to accommodate all the backwardly flowing water without risk of overflow, and further water can only now enter the system via pipe 16, ball valve 17, cistern 6 and chamber 5, after the reflux water mentioned above has flowed back as solution. The solution formed passes out through filter 7, pipes 23, 22 to socket 20, through passage 41 which is open, through chamber 29, pipe 31 and head 32. After passing through the beds 3 and 4, the liquid escapes through pipes 35 and 34 to chamber 30, and out through holes 44, 43, into the hollow part of plug 37; thence it escapes slowly through the hole at 48 in screw plug 47, and falls into funnel 9 leading by pipe 26 to the drain. When all the solution has passed through it will be followed by clear water admitted by ball-valve 17, which washes out the system, so that after about 10 hours from the commencement of regenerating the plant will be ready for further use in supplying softened water. If it is not quite ready, as indicated by the usual tests with soap solution for example, it can be cleansed rapidly by screwing back the plug 47 for a time so as to allow of a more rapid flow of liquid. Finally the cock is set again to the softening position.

If the reflux flow of water from the house pipes were not desired for any reason on commencing to regenerate, it could be prevented by closing cock 15, or it could be prevented automatically by providing the plug 37 of the cock with a block 57 as shown in Figure 7ª, which would close socket 21 during regenerating. Such block is aplied to the plug 37 of the cock when turned to such a position (at 90° to that of Figures 5 to 8) that the block 57 can be inserted via chamber 30 and attached by a screw to the plug 37 or otherwise secured thereto. The block 57 may be of fibre for example, as it is not required to withstand any considerable pressure, and a slight leakage of water past it is of no consequence.

The regeneration is effected in a similar manner whatever the reagent may be in the bed 3, but different reagents may require different salts or solutions to be supplied for regenerating purposes. The common salt required for regenerating zeolites can be put in chamber 5 in large lumps, and will all be dissolved by the water therein, and by the further water supplied thereto; so that, for example, a block of salt of the required size and weight can be put in without the necessity of breaking it up or dissolving it in advance, and such blocks are easily procurable.

It will be seen that in the plant constructed as above described, the whole apparatus stands on one base, with convenient connections to the supply systems such that the plant can be cut out of circuit for repairs, cleaning and so forth, with a minimum of disturbance. The system is compact and easy to instal and to operate, one plug cock serving to change the connections from softening to regenerating and vice versa.

Having thus described my invention what I claim as new and desire to secure by Letters Patent is:—

1. A plant for use in treating water for softening and like purposes, and involving the use of a reagent which requires regenerating at intervals, said plant comprising a vessel the lower portion of which forms a chamber adapted to contain the active material and a bed of filtering material, and the upper portion of which forms a separate chamber for the regenerating solution, a ball cistern in connection with said separate chamber, a multiple-way cock, comprising an outer shell with a discharge outlet to waste, and a plug with passages therein fitting in said shell, pipes connecting the shell of said cock with the water inflow and outflow and with the separate chamber, a distributing head in the lower chamber above the active material, a pipe connecting the distributing head with the shell of the cock, a collecting pipe and connections leading from near the bottom of the lower chamber to the shell of the cock, the plug of said cock being adapted to be set in either of two positions, in one of which water can only flow through the lower chamber for treatment therein, while in the other position regenerating solution can flow from said separate chamber through the lower chamber for regenerating purposes, followed by water from said ball cistern for washing out purposes, the spent solution and the waste washing water being discharged through the waste outlet of said cock.

2. A plant for use in treating water for softening and like purposes, and involving the use of a reagent which requires regenerating at intervals, said plant comprising an upper chamber for a regenerating solution, a lower chamber adapted to contain the active material and a bed of filtering material, an arched partition between the two chambers, a ball cistern in connection with said upper chamber, a multiple-way cock having a shell and a plug adapted to turn therein, pipes connecting said cock with the water inflow and outflow and with the chambers, the plug of said cock having a plurality of passages therein, said plug being adapted to be turned into either of two positions, in one of which water can flow from the inflow through one of the passages in the plug into the lower chamber above the active material, then through the active material and through another passage in the plug to the outflow, while in the other position regenerating solution can pass from the upper chamber through another passage in the plug, then to the bottom of the lower chamber and up through the active material and out through another passage in the cock to waste.

3. A plant for use in treating water for softening and like purposes, and involving the use of a reagent which requires regenerating at intervals, said plant comprising a vessel the lower portion of which forms a chamber adapted to contain the active material and a bed of filtering material, and the upper portion of which forms a separate chamber for the regenerating solution, a ball cistern in connection with said separate chamber, a cock whose shell has two chambers and a plurality of ports therein, two ports communicating with one of the chambers in the cock casing and two additional ports communicating with the second chamber in the cock casing, pipes connecting other ports in the cock casing respectively with the separate chamber and with the water inflow and outflow, a distributing head with connections to one of the chambers in the cock casing, a collecting pipe and connections leading from the bottom of the lower chamber to the second chamber in the cock casing, a plug in said cock casing, said plug having a plurality of passages therein and being adapted to be moved into either of two positions, in one of which water can flow only through the lower chamber for treatment therein, while in the other position regenerating solution can flow from the separate chamber through the lower chamber for regenerating purposes followed by water from said ball system, means for controlling the discharge to waste of water through the plug during regeneration and a funnel and pipe for receiving and carrying away the discharged water.

4. A plant for use in treating water for softening and like purposes, and involving the use of a reagent which requires regenerating at intervals, said plant comprising a vessel the lower portion of which forms a chamber adapted to contain the active material and a bed of filtering material, and the upper portion of which forms a separate chamber for the regenerating solution, a ball cistern in connection with said separate chamber, a multiple-way cock having an outlet for discharge to waste, and pipes connecting said cock with said chambers and with the water inflow and outflow, a supply pipe to which said inflow and outflow pipes are connected at points at a distance apart, valves in said inflow and outflow pipes and a valve in said supply pipe intermediate between the points of connection of said inflow and outflow pipes, whereby the water treating plant can be cut out of circuit when required by opening said valve in the supply pipe and closing said valves in the inflow and outflow pipes, said multiple-way cock being adapted to be set in either of two positions, in one of which water can flow only through the lower chamber for treatment therein, while in the other position regenerating solution can flow from said separate chamber through the lower chamber for regenerating purposes, followed by water from said ball cistern for washing out purposes, the spent solution and the waste washing water being discharged through the waste outlet of said cock.

HENRY J. MAGRATH.